United States Patent [19]
Takeuchi et al.

[11] Patent Number: 4,905,218
[45] Date of Patent: Feb. 27, 1990

[54] OPTICAL MULTIPLEX COMMUNICATION SYSTEM

[75] Inventors: Kunihiko Takeuchi, Kawasaki; Yasuo Shimomura, Tokyo; Yuji Morishige, Funabashi; Kiyoshi Hayashi, Tokyo, all of Japan

[73] Assignee: Tokyo Keiki Company, Limited, Tokyo, Japan

[21] Appl. No.: 348,123

[22] Filed: May 3, 1989

Related U.S. Application Data

[63] Continuation of Ser. No. 175,579, Mar. 29, 1988, abandoned, which is a continuation of Ser. No. 81,610, Aug. 3, 1987, abandoned, which is a continuation of Ser. No. 746,765, Jun. 20, 1985, abandoned.

[30] Foreign Application Priority Data

Jun. 21, 1984 [JP] Japan .................................. 59-128119

[51] Int. Cl.$^4$ ............................................... H04B 9/00
[52] U.S. Cl. ........................................... 370/3; 370/1; 340/825.65; 340/870.12
[58] Field of Search ........................ 455/608, 617, 618; 370/1, 3, 69.1; 340/825.72, 825.73, 825.76, 870.12, 825.65; 375/25, 62, 66, 88, 89

[56] References Cited

U.S. PATENT DOCUMENTS

| | | | |
|---|---|---|---|
| 2,640,973 | 6/1953 | Cleaver et al. | 370/69.1 |
| 3,259,693 | 7/1966 | Watanabe | 340/870.12 |
| 3,378,817 | 4/1968 | Vitt | 340/825.76 |
| 3,471,644 | 10/1969 | Gold et al. | 375/25 |
| 3,671,670 | 6/1972 | Saltzberg | 375/62 |
| 4,390,877 | 6/1983 | Curran | 340/825.72 |
| 4,426,637 | 1/1984 | Apple et al. | 340/825.65 |

Primary Examiner—Benedict V. Safourek
Assistant Examiner—T. Salindong
Attorney, Agent, or Firm—Fleit, Jacobson, Cohn, Price, Holman & Stern

[57] ABSTRACT

An optical multiplex communication system in which n kinds of digital signals whose logical levels do not simultaneously become true, such as, pulse motor controlling pulses, are multiplexed through a single optical fiber line. The transmitting end generates n kinds of carrier clock signals of different frequencies by clock generating means, produces the respective logical products of the carrier clock signals and the digital signals and then produces a logical sum of the logical product outputs by logical circuits and converts the logical sum output to a light signal by a light transmitter, thereby delivering the light signal onto the single optical fiber line. On the other hand, the receiving end receives and reconverts the light signal to an electric signal by a light receiver, applies the electric signal to n band-pass filters each having a pass band corresponding to the frequency of one of the carrier clock signals to extract the signal according to the frequency, and then detects the filter output by detection circuit means to restore it to the transmitted digital signal.

2 Claims, 3 Drawing Sheets

OPTICAL MULTIPLEX COMMUNICATION SYSTEM

This application is a continuation of application Ser. No. 175,579, filed Mar. 29, 1988, which is a continuation of application Ser. No. 081,610, filed Aug. 3, 1987, which in turn is a continuation of application Ser. No. 746,765, filed June 20, 1985, all abandoned.

BACKGROUND OF THE INVENTION

1. Field of the Invention

The present invention relates to an optical multiplex communication system in which n kinds of digital signals whose logical levels do not become true simultaneously, such as, control pulses for a pulse motor, are multiplexed through an optical fiber line.

SUMMARY OF THE INVENTION

It is the primary object of the present invention to provide a digitized optical multiplex communication system which is capable of transmitting plural kinds of signals over a single line without requiring sampling and which is excellent in non-delay performance and high-speed performance.

In accordance with the invention, there is thus provided an improved optical multiplex communication system in which n kinds of digital signals, which do not simultaneously become true, are transmitted from a transmitting end to a receiving end by a single optical fiber line forming a part of a digital link. In the improved system the transmitting end includes clock generating means for generating n kinds of carrier clock signals having different frequencies, logical circuit means for producing the respective logical products of the digital signals and the carrier clock signals, and then producing a logical sum of the n logical product outputs, and a light transmitter for converting the output of the logical circuit means to a light signal and delivering it onto the optical fiber line. The receiving end includes a light receiver for receiving the light signal from the optical fiber line and converting it to an electric signal, n band-pass filters each having a pass band corresponding to the frequency of one of the carrier clock signals to extract the output of the light receiver in accordance with the frequency, and a plurality of detection circuits each adapted to detect the signal passed through one of the filters and restore it to the original digital signal.

The digital signals may include CW (clockwise) pulses, CCW (counterclockwise) pulses and a reset pulse for controlling the operation of a pulse motor.

ADVANTAGES OF THE INVENTION

In accordance with the optical multiplex communication system of the invention, in which n kinds of digital signals whose logical levels do not simultaneously become true, are transmitted over a single optical fiber line, by virtue of the fact that a transmitting end generates n kinds of carrier clock signals by clock generating means, produces the respective logical products of the carrier clock signals and the digital signals, and then produces a logical sum of the logical product outputs by logical circuit means and converts the logical sum output to a light signal by a light transmitter, thereby delivering the light signal onto the single optical fiber line, and that a receiving end reconverts the light signal to an electric signal by a light receiver, applies the electric signal to n band-pass filters each having a pass band corresponding to the frequency of one of the carrier clock signals, thereby extracting the signal of the corresponding frequency, and then detects the filter output by detection circuit means, thereby restoring it to the transmitted digital signal, there are great advantages in that no sampling is required as in the case of the conventional synchronous/asynchronous communication system and thus no restriction is imposed by the transmission speed due to the sampling period, thereby ensuring the desired non-delay performance, that the interval of time between the instance that the digital signal goes to a H level (true) at the transmitting end and the instance that the restored digital signal goes to the H level (true) is constant so that equivalent communication performance, as with the conventional system using an optical fiber link for each kind of digital signals, is ensured as regards non-delay performance and high-speed performance, and that the transmission of plural kinds of signals can be effected by means of a single optical fiber line.

Further, since the receiving end is entirely composed of digital components in contrast to the conventional analog multiplex communication system by frequency division, no adjustments, etc., are required and the circuit operation is also stable.

Still further, the number of component parts is very small so that the system is reduced in size and also realized inexpensively.

The above and other objects as well as advantageous features of the invention will become more clear from the following description taken in conjunction with the drawings.

DESCRIPTION OF THE PRIOR ART

Figure 3:
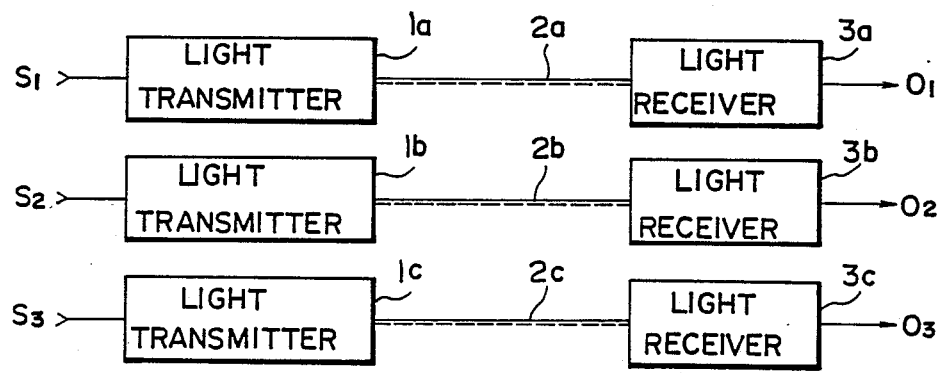
FIGS. 3, 4 and 5 are schematic block diagrams showing respectively different types of conventional optical communication systems.
Figure 4:
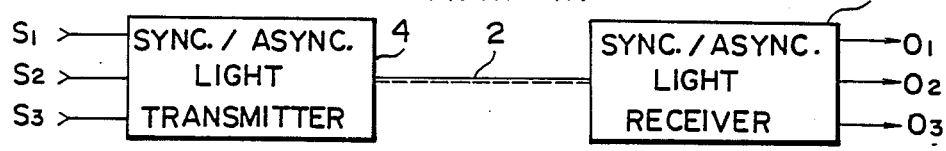
Figure 5:
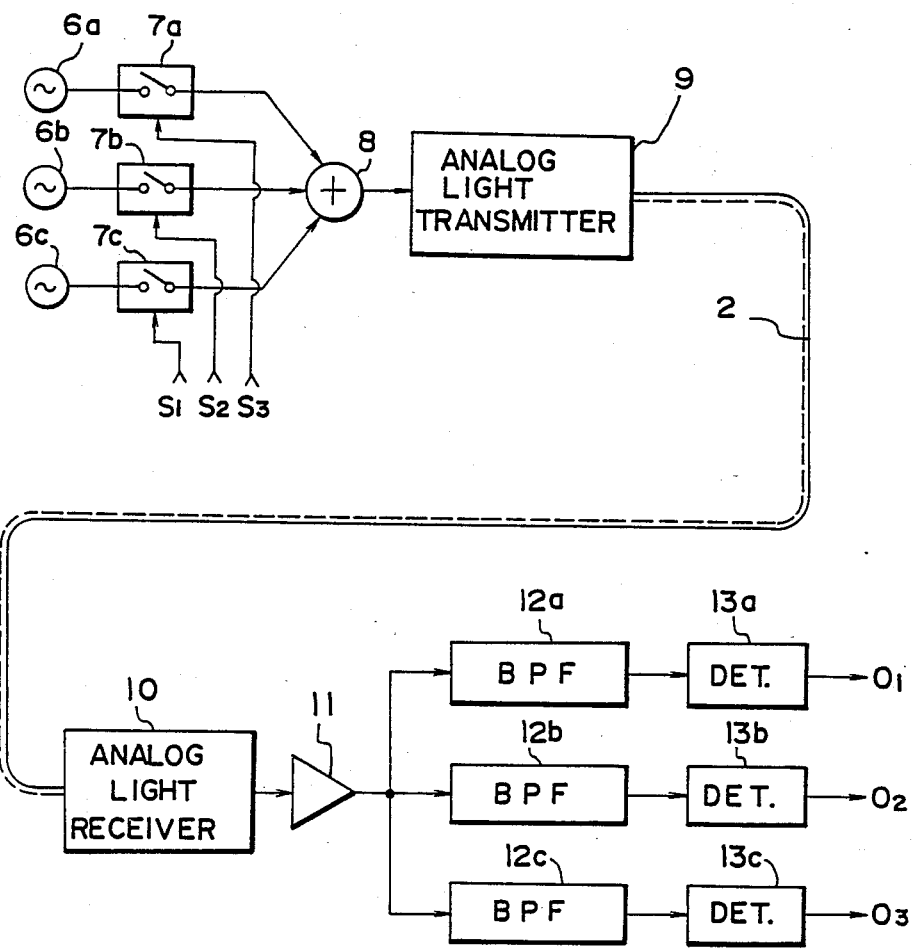

Optical communication systems heretofore known for transmitting a plurality of different digital signals over an optical fiber line include those shown for example in FIGS. 3, 4 and 5.

FIG. 3 shows the most basic type in which digital signals to be transmitted by optical communication include three kinds of signals $S_1$, $S_2$ and $S_3$, for these three digital signals are respectively provided light transmitters 1a, 1b and 1c, optical fiber lines 2a, 2b and 2c and light receivers 3a, 3b and 3c and each of the three digital signals is transmitted over a separate optical fiber link.

FIG. 4 shows another type in which commercially available synchronous/asynchronous light transmitter 4 and synchronous/asynchronous light receiver 5 are used so that digital signals $S_1$, $S_2$ and $S_3$ parallelly applied to the synchronous/asynchronous light transmitter 4 are sampled, subjected to parallel-to-serial conversion, converted to light signals and delivered through a single optical fiber line 2 to the synchronous/asynchronous light receiver 5 where the received signals are reconverted and subjected to serial-to-parallel conversion thus reproducing output signals $O_1$ to $O_3$.

Then, FIG. 3 shows an analog optical multiplex communication system of the frequency division type in which are provided oscillators 6a, 6b and 6c having different frequencies $f_1$, $f_2$ and $f_3$, respectively, corresponding to three kinds of digital signals $S_1$, $S_2$ and $S_3$, and the on-off operation of analog switches 7a, 7b and 7c are respectively controlled by the digital signals $S_1$, $S_2$ and $S_3$, thereby subjecting them to digital/frequency conversion. Then the signals are combined by a mixer 8 and converted to light signals by an analog light transmitter 9 thereby delivering the signals onto an analog optical fiber line 2. At the receiving end, the frequency signals are reproduced from the light signal by an analog light receiver 10 so that after having been amplified by an analog amplifier 11, the frequency signals are respectively discriminated by band-pass filters 12a, 12b and 12c, respectively having pass bands $(f_1 \pm \Delta f)$, $(f_2 \pm \Delta f)$ and $(f_3 \pm \Delta f)$ corresponding to the frequencies $f_1$, $f_2$ and $f_3$, and then restored to the digital signals by detection circuits 13a, 13b and 13c, respectively, thus generating outputs $O_1$, $O_2$ and $O_3$.

However, the communication system of FIG. 3 is disadvantageous in that, while at the same time that the digital signals $S_1$ to $S_3$ go to the H level (true) at the transmitting end, the output signals $O_1$ to $O_3$ go to the H level at the receiving end, thus improving the high-speed performance and non-delay performance, a separate optical fiber link is required for each kind of digital signal and this results in complication of the equipment and rise in the cost thereof in proportion to the number of kinds of digital signals to be transmitted.

Also, the communication system of FIG. 4 is disadvantageous in that since the transmission speed is dependent on the sampling period at the receiving end, it is impossible to transmit signals which are faster than the sampling period and increasing the sampling period to overcome this deficiency results in an increase in the transmission error rate, thus requiring the addition of considerable circuits for the purpose of error checking, etc.

Further, the analog optical multiplex communication system of the frequency division type shown in FIG. 5 is disadvantageous in that since the analog switches, the mixer, the oscillators, the high-gain analog amplifier, etc., are mounted on a digital circuit board, a number of difficulties are involved for ensuring the desired stability of the analog circuit system an also there is another problem of increasing the cost.

DESCRIPTION OF THE PREFERRED EMBODIMENTS

The present invention has been made with a view to overcoming the foregoing deficiencies in the prior art and in order that n kinds of digital signals which do not become true simultaneously may be transmitted over a single optical fiber line by using only simple digital circuits composed of logical computing elements. The present invention features a transmitting end which generates n kinds of carrier clock signals of different frequencies by clock generating means, produces the respective logical products of the carrier clock signals and the digital signals, and then a logical sum of the logical product outputs by logical circuit means and converts the logical sum output to a light signal by a light transmitter, thereby delivering the light signal over the single optical fiber line. A receiving end reconverts the received signal to an electric signal by a light receiver, applies the reconverted signal to n band-pass filters each having a pass band corresponding to the frequency of one of the carrier clock signals to extract a signal corresponding to the frequency, and detects the resulting filter output by detection circuit means, thus restoring it to the transmitted digital signal.

Figure 1:
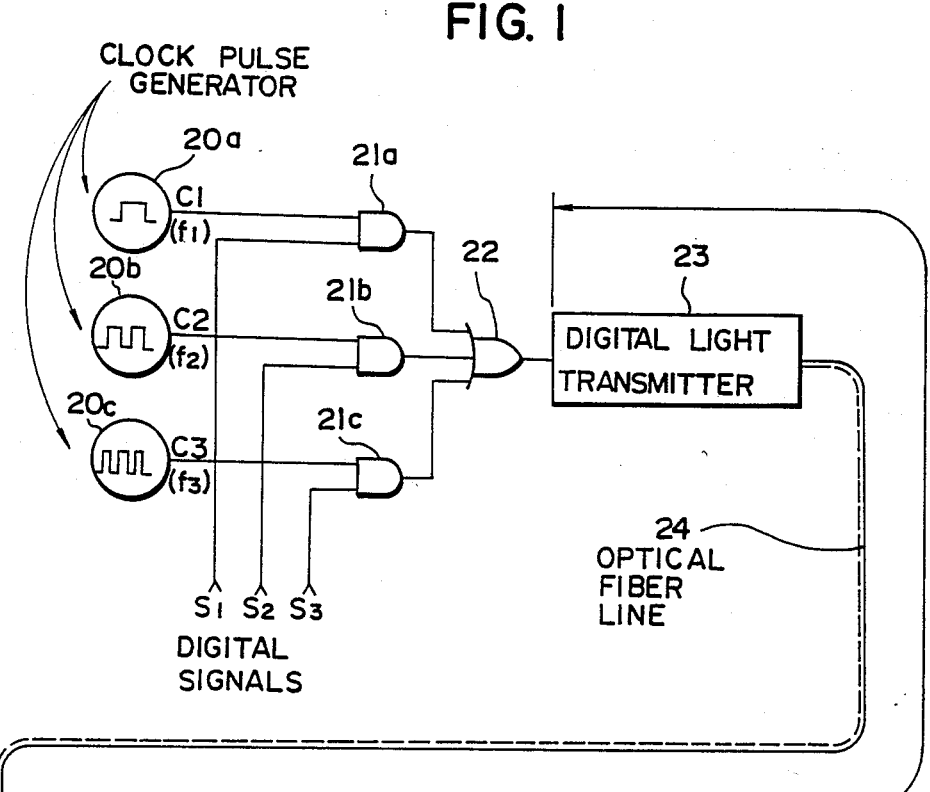
FIG. 1 is a block diagram showing an embodiment of the present invention.
Figure 1:
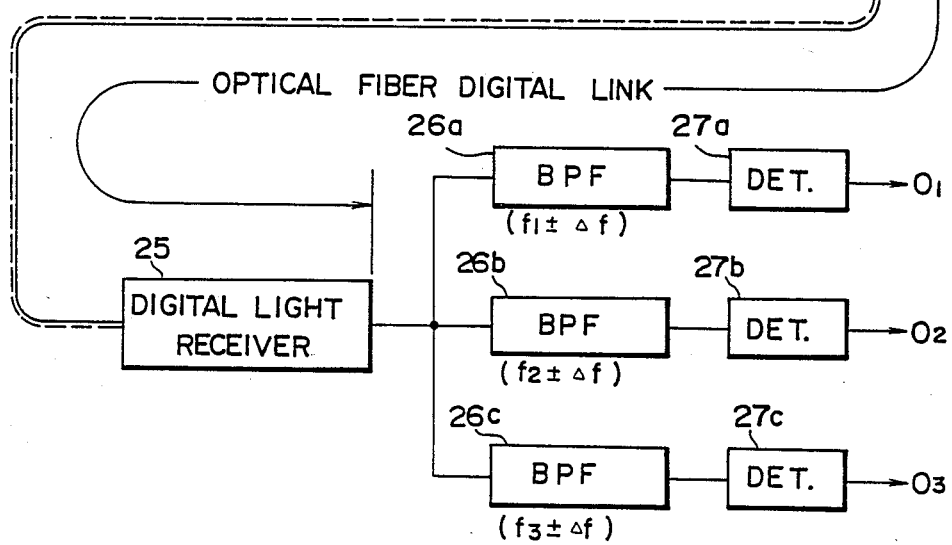

FIG. 1 is a block diagram showing an embodiment of the invention showing by way of example a case in which three kinds of digital signals $S_1$, $S_2$ and $S_3$ are transmitted as digital signals.

The construction of a transmitting end will be described first. Numerals 20a, 20b and 20c designate clock pulse generators for generating carrier clock signals $C_1$, $C_2$ and $C_3$ of different pulse frequencies $f_1$, $f_2$ and $f_3$, respectively, corresponding to the digital signals $S_1$, $S_2$ and $S_3$, and specifically they comprise pulse generators or frequency dividers consisting of counters or the like.

The outputs $C_1$, $C_2$ and $C_3$ of the clock pulse generators 20a to 20c are respectively applied to AND gates 21a, 21b and 21c and the digital signals $S_1$, $S_2$ and $S_3$ are respectively applied to the other input of the AND gates 21a to 21c. Thus, the AND gates 21a to 21c, respectively, generate the logical products $S_1 \cdot C_1$, $S_2 \cdot C_2$ and $S_3 \cdot C_3$ of the carrier clock signals $C_1$ to $C_3$ and the digital signals $S_1$ to $S_2$. The outputs of the AND gates 21a to 21c are applied to an OR gate 22 which in turn generates a logical sum output.

It is to be noted that the digital signals $S_1$ to $S_3$ are such that they do not simultaneously go to the H level (true) and they may, for example, comprise a combination of pulse signals, such as CW (clockwise) pulses, CCW (counter-clockwise) pulses and a reset pulse for controlling the forward and reverse rotations and return-to-starting point of a pulse motor.

The logical sum output of the OR gate 22 is applied to a digital light transmitter 23 so that it is converted to a light signal and delivered onto a single optical fiber line 24.

A receiving end will now be described. The optical fiber line 24 is connected to a digital light receiver 25 which in turn converts the received light signal to an electric signal and generates it.

Note that the digital light transmitter 23, the optical fiber line 24 and the digital light receiver 25 form a digital optical fiber link.

Arranged after the digital light receiver 25 are band-pass filters 26a, 26b and 26c respectively, having pulse frequency pass bands $(f_1 \pm \Delta f)$, $(f_2 \pm \Delta f)$ and $(f_3 \pm \Delta f)$ respectively corresponding to the pulse frequencies $f_1$, $f_2$ and $f_3$ of the carrier clock signals and these filters extract the basic frequency components $f_1$, $f_2$ and $f_3$ of the carrier clock signals contained in the signals received and reconverted by the digital light receiver 25. Detection circuits 27a, 27b and 27c are respectively connected to the output of the band-pass filters 26a to 26c and thus the frequency components extracted by the band-pass filters 26a to 26c are detected, thereby generating signals $O_1$ to $O_2$ respectively, corresponding to the transmitting-end digital signals $S_1$ to $S_3$.

The operation of the embodiment of FIG. 1 will now be described. With the digital signals $S_1$, $S_2$ and $S_3$ applied to the transmitting end, only one of the signals always goes to the H level (true) at a and two or more of the signals never go to the H level (true) simultaneously. For instance, if the digital signal $S_1$ goes to the H level, the other digital signals $S_2$ and $S_3$ go to an L level so that the AND gate 21a is enabled by the digital signal $S_1$ and the carrier signal of the frequency $f_1$ from clock pulse generator 20a is generated as a logical product output $S_1 \cdot C_1$ and applied to the digital light transmitter 23 through the OR gate 22. The digital light transmitter 23 delivers onto the optical fiber line 24 a light signal corresponding to the carrier clock signal $C_1$ generated during the time that the digital signal $S_1$ is at the H level and therefore the digital light receiver 25 generates a receiver reconverted signal having the basic frequency $f_1$. The receiver reconverted signal is applied to each of the band-pass filters 26a to 26c so that, since the frequency of the reconverted carrier clock signal is $f_1$, the band-pass filter 26a generates an output and thus the detection circuit 27a generates an output signal $O_1$ corresponding to the receiving-end digital signal $S_1$.

This way of digital signal transmission is the same with the other digital signals $S_2$ and $S_3$.

Figure 2:
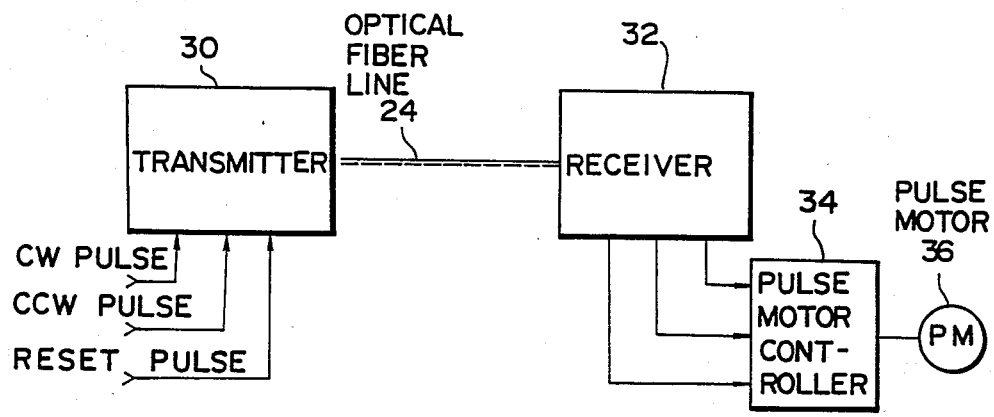
FIG. 2 is a block diagram for explaining a remote control system for a pulse motor, which employs the optical multiplex communication system of FIG. 1.

FIG. 2 is a block diagram for explaining a case in which the optical multiplex communication system of the invention shown in FIG. 1 is used for the remote control of a pulse motor which is used with a digital control valve or the like.

More specifically, a transmitter 30 includes the clock pulse generating means, the logical circuits and the digital light transmitter which are shown in FIG. 1, and a receiver 32 includes the digital light receiver, the bandpass filters. The detection circuits of FIG. 1 and the transmitter 30 and the receiver 32 are connected by the optical fiber line 24 to provide an optical fiber link. Applied to the transmitter 30 are CW pulses, CCW pulses and a reset pulse for operating a pulse motor which is a controlled system and these signals are so correlated with one another that they do not simultaneously go to the H level (true).

On the other hand, the restored outputs of the transmitter 32 or the CW pulses, CCW pulses and reset pulse are applied to a pulse motor controller 34 and the controller 34 incorporates therein a counter, decoder, motor driver, etc., so that the pulse motor controller 34 causes a pulse motor 36 to make a single step movement in the clockwise direction in response to the application of each CW pulse and causes the pulse motor 36 to make a single step movement in the counterclockwise direction in response to the application of each CCW pulse. Also, when a reset pulse is applied, the energization of the pulse motor 36 is stopped so that the shaft torque of the motor 36 is reduced to zero and the internal counter is cleared.

In this remote control of the pulse motor by the use of the optical multiplex communication system of this invention, if the rotational speed of the pulse motor 36 is about 3000 pps, then the frequencies of the CW and CCW pulses become about 3 kHz and thus the corresponding frequencies of the carrier clock signals from the clock pulse generators 20a to 20c shown in FIG. 1 are such that the clock frequency $f_1$ becomes, for example, $f_1=455$ kHz, which is in the AM radio carrier frequency range, and the clock frequency $f_2$ becomes $f_2=470$ kHz. Thus, if the clock frequency $f_3$ is selected to be about $f_3=440$ kHz, the bands can be separated satisfactorily and the reproducibility of the digital signals at the receiving end is extremely high due to the clock frequencies of the carrier clock signals being satisfactorily high as compared with the digital signals to be multiplexed or the CW, CCW and reset pulses.

Further, as regards the non-delay performance and high-speed performance of the transmission, it is possible to select them as desired by suitably selecting the pass bands of the band-pass filters incorporated in the receiver 32, that is, if it is desired to operate the pulse motor 36 at a rotational speed of 5000 pps by the pulse motor remote control system shown in FIG. 2, it is only necessary that the band-pass filters have band-passes of about 5 to 10 kHz.

While the above-described embodiment is applied by way of example to the transmission of three kinds of digital signals used for the remote control of a pulse motor, the present invention is not intended to be limited thereto and the invention can be applied as such to the transmission of n kinds (n is an arbitrary integer) of digital signals whose logical levels do not simultaneously become true. Further, the transmission band of the optical fiber line can be selected as high as about 40 Mbs or over, and therefore the carrier clock frequencies can also be selected suitably within the transmission band of the optical fiber line.

What is claimed is:

1. In an optical multiplex communication system for transmitting n kinds of digital signals from a transmitting end to a receiving end by the use of a single digital-link optical fiber line, the improvement wherein:

said transmitting end includes means for generating said digital signals so that only one of said digital signals goes true at a time, and two or more digital signals never go true simultaneously; clock pulse generating means for generating n kinds of carrier clock signals having different pulse frequencies, one for each of said digital signals of said digital signals and a respective one of said carrier clock signals when said digital signal goes true, to produce a logical product output, whereby said logical circuit means produces n logical product outputs; means for producing a logical sum output of said n logical product outputs; and digital optical transmitter means for converting the logical sum output of said logical circuit means to a light signal and delivering the same onto said optical fiber line; and said receiving end includes digital light receiver means for receiving said light signal from said optical fiber line and converting the same to an electric signal output; n band-pass filter means each having a pulse frequency pass band corresponding to the frequency of a respective one of the pulse frequencies of said carrier clock signals, so as to extract from the electric signal output of said digital light receiver means a signal having said one pulse frequency and passing said extracted signal; and detection circuit means for detecting the extracted signal passed by each of said filter means and generating signals corresponding to respective ones of said digital signals, thereby restoring corresponding ones of said digital signals.

2. A system according to claim 1, wherein said clock pulse generating means generates digital signals for controlling the operation of a pulse motor, said digital signals including clockwise pulse signals for controlling the rotation of said pulse motor in a forward direction, counterclockwise pulse signals for controlling the rotation of said pulse motor in a reverse direction and a reset pulse signal for returning said pulse motor to a starting point.

* * * * *